(12) United States Patent
Fujii

(10) Patent No.: US 12,225,334 B2
(45) Date of Patent: Feb. 11, 2025

(54) RADIO RELAY SYSTEM

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/555,565

(22) PCT Filed: Apr. 12, 2022

(86) PCT No.: PCT/JP2022/017569
§ 371 (c)(1),
(2) Date: Mar. 14, 2024

(87) PCT Pub. No.: WO2022/224870
PCT Pub. Date: Oct. 27, 2022

(65) Prior Publication Data
US 2024/0276131 A1    Aug. 15, 2024

(30) Foreign Application Priority Data

Apr. 19, 2021  (JP) ................. 2021-070211

(51) Int. Cl.
*H04Q 11/00* (2006.01)
(52) U.S. Cl.
CPC . *H04Q 11/0071* (2013.01); *H04Q 2011/0086* (2013.01); *H04Q 2213/02* (2013.01)
(58) Field of Classification Search
CPC .................................................. H04Q 11/0071
See application file for complete search history.

(56) References Cited

U.S. PATENT DOCUMENTS 7,228,077 B2 * 6/2007 Newell ................... H04J 1/065
398/159
2018/0191439 A1   7/2018 Morser et al.
(Continued)

FOREIGN PATENT DOCUMENTS

EP       3 624 479 A1    3/2020
JP     2006-295309 A    10/2006
(Continued)

OTHER PUBLICATIONS

"Successful Demonstration Experiment of Wired Power Supply Drone Wireless Relay System", Press Release 2020 of SoftBank Corp., Jul. 9, 2020, URL: https://www.softbank.jp/corp/news/press/sbkk/2020/20200709_01/.
(Continued)

*Primary Examiner* — Shi K Li
(74) *Attorney, Agent, or Firm* — Muirhead and Saturnelli, LLC

(57) ABSTRACT

Provided is a repeater-type radio relay system that can prevent loop interference of radio waves with the same frequency and does not require a frequency for relaying. The radio relay system is provided with one or more optical fibers for relaying an optical communication between a relay-source radio relay apparatus and a relay-destination radio relay apparatus. The relay-source radio relay apparatus has a network-side communication section for communicating with a mobile-communication network side, and an electro-optical signal conversion section of relay source for converting between an electrical signal in the mobile-communication network side received from the network-side communication section and an optical signal propagating through the optical fiber. The relay-destination radio relay apparatus has a terminal-side communication section for wirelessly communicating with the terminal apparatus side, and an electro-optical signal conversion section of relay
(Continued)

destination for converting between an electric signal in the terminal apparatus side received from the terminal-side communication section and an optical signal propagating through the optical fiber.

12 Claims, 7 Drawing Sheets

(56) References Cited

U.S. PATENT DOCUMENTS

| | | | |
|---|---|---|---|
| 2020/0225684 A1* | 7/2020 | Anderson | B64U 50/30 |
| 2020/0307830 A1 | 10/2020 | Fischer | |
| 2022/0190924 A1* | 6/2022 | Tomita | H04B 10/506 |
| 2022/0393764 A1* | 12/2022 | Ito | H04B 10/25753 |
| 2024/0040436 A1* | 2/2024 | Shinohara | H04W 24/10 |

FOREIGN PATENT DOCUMENTS

| | | |
|---|---|---|
| JP | 2010-154064 A | 7/2010 |
| JP | 2011-077579 A | 4/2011 |
| WO | WO 2018/163991 A1 | 9/2018 |

OTHER PUBLICATIONS

International Search Report and Written Opinion Dated for PCT Application No. PCT/JP2022/017569, Jul. 19, 2022.
Notice for Reasons of Refusal for Japanese Patent Application No. 2021-070211, Dated Jul. 7, 2022.
International Preliminary Report on Patentability Dated Oct. 24, 2023, for PCT Application No. PCT/JP2022/017569.
Decision to Grant Patent for Japanese Application No. 2021-070211, dated Feb. 28, 2023.
European Search Report, dated Jun. 5, 2024.
European Office Action, dated Jun. 17, 2024.
European Office Action, Dated Jan. 3, 2025.

\* cited by examiner

RADIO RELAY SYSTEM

TECHNICAL FIELD

The present invention relates to a repeater-type radio relay system that relays a radio communication by a relay station located in an upper airspace.

BACKGROUND ART

As this type of radio relay system, there is conventionally known a moored-balloon radio relay system and a wired-power supply drone radio relay system (see, for example, Non-Patent Literature 1). In the moored-balloon radio relay system, a relay station is mounted on a moored balloon that is moored and supported by a mooring line (mooring rope) that extends from the ground to the upper airspace, and an electric power is supplied to the relay station from a ground-power supply apparatus via a wired-power supply cable. In the wired-power supply drone radio relay system, a relay station is mounted on a drone (unmanned aerial vehicle) capable of stopping flight (hovering) in the upper airspace, and electric power is supplied to the relay station from a ground-power supply apparatus via a wired-power supply cable.

CITATION LIST

Non-Patent Literature

Non-Patent Literature 1: "Successful demonstration experiment of wired-power supply drone radio relay system", [online], Jul. 9, 2020, Soft Bank Corp., news, press release 2020, [searched Dec. 24, 2020], Internet <URL: https://www.softbank.jp/corp/news/press/sbkk/2020/20200709_01/>

SUMMARY OF INVENTION

Technical Problem

The conventional radio relay system is a radio relay repeater system of non-regenerative frequency conversion type, and for each of the downlink from the network side to the terminal apparatus and the uplink from the terminal apparatus to the network side, a radio wave (frequency f1) for relaying is required for radio communication between a radio relay apparatus (slave repeater) in the upper airspace and a radio relay apparatus (master repeater) on the ground in order to prevent loop interference of radio waves with the same frequency.

Solution to Problem

A radio relay system according to an aspect of the present invention is a radio relay system comprising a relay-source radio relay apparatus and a relay-destination radio relay apparatus located in an upper airspace. The radio relay apparatus comprises one or plural optical fibers for relaying optical communication between the relay-source radio relay apparatus and the relay-destination radio relay apparatus. The relay-source radio relay apparatus has a network-side communication section for communicating with a mobile-communication network side, and an electro-optical signal conversion section of relay source for performing conversion between an electric signal of the mobile-communication network side received from the network-side communication section and an optical signal propagating through the optical fiber. The relay-destination radio relay apparatus has a terminal-side communication section for wirelessly communicating with a terminal apparatus side, and an electro-optical signal conversion section of relay destination for performing a conversion between an electric signal of terminal apparatus side received from the terminal-side communication section and an optical signal propagating through the optical fiber.

In the foregoing radio relay system, the radio relay system may comprise a downlink optical fiber for transmitting a downstream optical signal that is directed from the relay-source radio relay apparatus to the relay-destination radio relay apparatus, and an uplink optical fiber for transmitting an upstream optical signal that is directed from the relay-destination radio relay apparatus to the relay-source radio relay apparatus, the electro-optical signal conversion section of relay source may have a downstream-signal conversion section for converting a downstream electrical signal to the downstream optical signal, and an upstream-signal conversion section for converting the upstream optical signal to an upstream electrical signal, and the electro-optical signal conversion section of relay destination may have a downstream-signal conversion section for converting the downstream optical signal to a downstream electrical signal, and an upstream-signal conversion section for converting an upstream electrical signal to the upstream optical signal.

In the foregoing radio relay system, the radio relay system may comprise a single optical fiber for propagating a downstream optical signal with a first wavelength, which is directed from the relay-source radio relay apparatus to the relay-destination radio relay apparatus, and an upstream optical signal with a second wavelength different from the first wavelength, which is directed from the relay-destination radio relay apparatus to the relay-source radio relay apparatus, the electro-optical signal conversion section of relay source may have a downlink conversion section for converting a downstream electrical signal to the downstream optical signal with the first wavelength, an uplink conversion section for converting the upstream optical signal with the second wavelength to an upstream electrical signal, and a wavelength-division multiplex connection section that is connected to the downlink conversion section and the uplink conversion section, and connected to the optical fiber, and the electro-optical signal conversion section of relay destination may have a downstream-signal conversion section for converting the downstream optical signal with the first wavelength to a downstream electrical signal, an upstream-signal conversion section for converting an upstream electrical signal to the upstream optical signal with the second wavelength, and a wavelength-division multiplex connection section for connecting the downlink conversion section and the uplink conversion section to the optical fiber.

In the foregoing radio relay system, the downlink transmission from the relay-source radio relay apparatus to the relay-destination radio relay apparatus may be a MIMO transmission in which plural (N) signals are transmitted simultaneously using a same frequency, the relay-source radio relay apparatus may have plural downstream-signal conversion sections for converting plural (N) downstream electrical signals received from the network-side communication section to plural (N) downstream optical signals with first wavelengths different from each other and inputting the converted signals into the optical fiber, and the relay-destination radio relay apparatus may convert the plural (N) downstream optical signals with the first wavelengths outputted from the optical fiber to plural (N) electrical signals and transfer the converted signals to the terminal-side communication section.

In the foregoing radio relay system, the downlink transmission from the relay-source radio relay apparatus to the relay-destination radio relay apparatus may be a MIMO transmission in which plural (N) signals are transmitted simultaneously using a same frequency, the network-side communication section of the relay-source radio relay apparatus may generate plural intermediate signals obtained by changing carrier frequencies of plural (N) downstream electrical signals to plural carrier frequencies different from each other, add together the plural intermediate signals, and input the added plural intermediate signals into the downstream-signal conversion section, and the terminal-side communication section of the relay-destination radio relay apparatus may branch the plural intermediate signals with the plural carrier frequencies outputted from the downstream-signal conversion section, and output the plural intermediate signals by restoring the carrier frequencies of the plural intermediate signals to the original carrier frequencies.

In the foregoing radio relay system, the uplink transmission from the relay-destination radio relay apparatus to the relay-source radio relay apparatus may be a MIMO transmission in which plural (N) signals are transmitted simultaneously using a same frequency, the relay-destination radio relay apparatus may have plural upstream-signal conversion sections for converting plural (M) upstream electrical signals received from the terminal-side communication section to plural (M) upstream optical signals with second wavelengths different from each other and inputting the converted signals into the optical fiber, and the relay-source radio relay apparatus may convert the plural (M) upstream optical signals with the second wavelengths outputted from the optical fiber to plural (M) electrical signals and transfer the converted signals to the network-side communication section.

In the foregoing radio relay system, the uplink transmission from the relay-destination radio relay apparatus to the relay-source radio relay apparatus may be a MIMO transmission in which plural (M) signals are transmitted simultaneously using a same frequency, the terminal-side communication section of the relay-destination radio relay apparatus may generate plural intermediate signals obtained by changing carrier frequencies of plural (M) upstream electrical signals to plural carrier frequencies different from each other, add together the plural intermediate signals, and input the added plural intermediate signals into the upstream-signal conversion section, and the network-side communication section of the relay-source radio relay apparatus may branch the plural intermediate signals with the plural carrier frequencies outputted from the upstream-signal conversion section, and output the plural intermediate signals by restoring the carrier frequencies of the plural intermediate signals to the original carrier frequencies.

In the foregoing radio relay system, the radio relay system may perform the MIMO transmission in which two signals simultaneously using the same frequency in the downlink from the relay-source radio relay apparatus to the relay-destination radio relay apparatus, and transmit one signal in the uplink from the relay-destination radio relay apparatus to the relay-source radio relay apparatus.

In the foregoing radio relay system, the radio relay system may perform the MIMO transmission in which two signals are transmitted simultaneously using the same frequency in the uplink from the relay-destination radio relay apparatus to the relay-source radio relay apparatus.

In the foregoing radio relay system, the relay-destination radio relay apparatus may relay plural downlink communications with frequencies that are different from each other and used by a same mobile communication carrier, and relay plural uplink communications with frequencies that are different from each other and used by the same mobile communication carrier.

In the foregoing radio relay system, the relay-destination radio relay apparatus may be mounted on an unmanned aerial vehicle or a moored balloon.

Advantageous Effects of Invention

According to the present invention, it is possible to provide a repeater-type radio relay system that can prevent loop interference of radio waves with the same frequency and does not require a frequency for relaying.

DESCRIPTION OF EMBODIMENTS

Hereinafter, embodiments of the present invention are described with reference to the drawings.

A system according to embodiments described herein is a temporary radio relay system capable of performing a radio relay for out of coverage areas of fixed base stations when a disaster occurs, when searching for victims in mountains, forest, etc. and so on, which is provided with a relay-source radio relay apparatus (master repeater) on the ground or on the sea and a radio relay apparatus (slave repeater) mounted on a flying object such as a drone (unmanned aerial vehicle) or a moored balloon. In particular, the radio relay system of the present embodiments is a repeater-type radio relay system that can prevent loop interference of radio waves with the same frequency and does not require a frequency for relaying, by performing a communication between the master repeater and the slave repeater with a ROF (Radio on Fiber) using an optical fiber.

Figure 1:
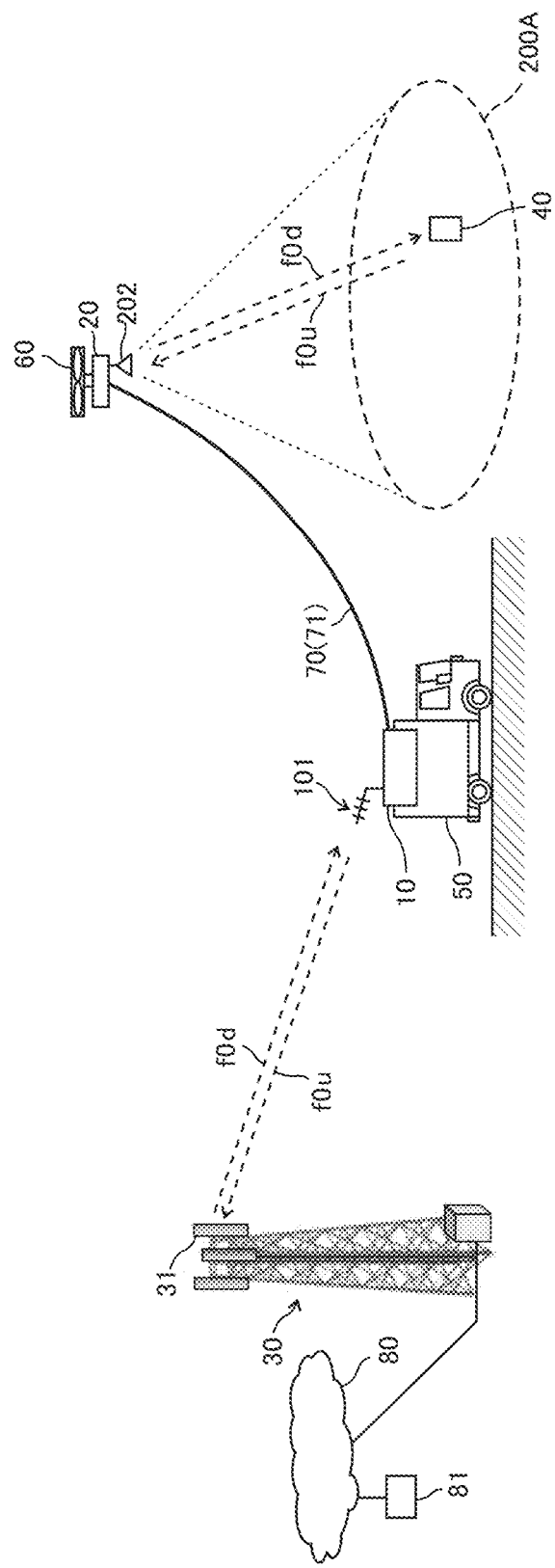
FIG. 1 is an illustration showing an example of an overall configuration of a communication system including a radio relay system according to an embodiment.

FIG. 1 is an illustration showing an example of an overall configuration of a communication system including a radio relay system according to an embodiment of the present invention.

In FIG. 1, the radio relay system according to the present embodiment is provided with a relay-source radio relay apparatus (hereinafter referred to as "master repeater") 10 located on the ground and a relay-destination radio relay apparatus (hereinafter referred to as "slave repeater") 20 located in the upper airspace. The master repeater 10 and the slave repeater 20 relay downlink and uplink radio communications between a fixed base station (hereinafter referred to as "base station") 30 such as eNodeB, gNodeB connected to a core network of a mobile communication network 80 of a communication operator (communication carrier) and a mobile station 40 as a single or plural terminal apparatuses (user apparatuses) located within a radio relay area of a communication operator (cell 200A of slave repeater 20).

It is noted that, the radio relay system of the present embodiments may relay plural radio signals of the downlink with frequencies different from each other used by the same communication operator, and may relay plural radio signals of the uplink with frequencies different from each other used by the same communication operator. The radio relay system of the present embodiments may relay plural radio signals of the downlink with frequencies different from each other used by plural communication operators, and may relay plural radio signals of the uplink with frequencies different from each other used by the plural communication operators.

The mobile communication network 80 may be provided with a remote control apparatus 81 (remote control source). The remote control apparatus 81 can hold information on, for example, the master repeater 10 and the slave repeater 20 and transmit control information to at least one of the master repeater 10 and the slave repeater 20. The remote control apparatus 81 may function as an information transmission destination and receive information from at least one of the master repeater 10 and the slave repeater 20. It is noted that the remote control apparatus 81 may be provided at a location outside the mobile communication network 80 as long as the location where it can communicate with the master repeater 10 and the slave repeater 20.

The mobile communication network 80 may be provided with a remote-drone control apparatus that remotely controls a drone 60 as a flying object on which the slave repeater 20 is mounted.

The remote control apparatus 81 may be, for example, a server, a PC or a tablet terminal, which is capable of communicating with the slave repeater 20 via the master repeater 10. The remote-drone control apparatus may be, for example, a server, a PC, or a tablet terminal, which is capable of communicating with the control section of the drone 60 via the master repeater 10.

The master repeater 10 transmits and receives radio signals with the first frequencies (also referred to as "radio relay frequency" or "base-station side frequency") f0d (downstream signal) and f0u (upstream signal), which are targeted for relaying to and from the base station 30 via an antenna (antenna for base station) 101 with directivity toward the antenna 31 of the base station 30. The master repeater 10 transmits and receives optical signals with a predetermined wavelength to and from the slave repeater 20 via a single or plural optical fibers 71 mounted on a cable 70. The master repeater 10 has an electro-optical signal conversion function for converting radio signals with frequencies f0d (downstream signal) and f0u (upstream signal) transmitted to and received from the base station 30 and optical signals with a predetermined wavelength transmitted to and received from the slave repeater 20.

The master repeater 10 can move to a target position on the ground by being mounted on an automobile 50 that is a vehicle as a moving object. The automobile 50 may be an electric automobile, a hybrid vehicle, a fuel cell vehicle, or the like, which is equipped with a battery, a generator, or the like, which is capable of supplying electric power to the master repeater 10 for a long period of time. The automobile 50 may be provided with a take-off and landing section where the drone 60 can take off and land. Although the configuration example in FIG. 1 is an example in which the master repeater 10 is incorporated in the automobile 50, the moving object in which the master repeater 10 is incorporated may be a vehicle other than an automobile that runs on roads, a railroad vehicle that runs on railroad tracks, an aircraft, or a ship on a river or on the sea.

The slave repeater 20 transmits and receives optical signals with a predetermined wavelength to and from the master repeater 10 via the single or plural optical fibers 71 mounted on the cable 70. The slave repeater 20 transmits and receives radio signals with the first frequencies (hereinafter also referred to as "radio relay frequency" or "mobile-station side frequency") f0d (downstream signal) and f0u (upstream signal), which are targeted for relaying to and from the mobile station 40 via the antenna for mobile station 202. The slave repeater 20 has an electro-optical signal conversion function for converting the optical signals with the predetermined wavelength transmitted to and received from the master repeater 10 and the radio signals with the frequencies f0d (downstream signal) and f0u (upstream signal) transmitted to and received from the mobile station 40.

The slave repeater 20 is mounted on the drone 60 as a flying object that is a floating object, which stays or moves in a predetermined airspace by an autonomous control or external control. The drone 60, on which the slave repeater 20 is mounted, is transported to the target position on the ground by the automobile (radio relay vehicle) 50 and controlled to stay in the upper airspace at a predetermined altitude from the ground level (for example, 100 to 150 m). Electric power is supplied to a flight drive section of the drone 60 and the slave repeater 20 from a battery installed in the drone 60. The flight drive section of the drone 60 and the slave repeater 20 may be supplied with electric power from the battery or generator mounted on the automobile 50 on the ground via a feeder line mounted on the cable 70.

The optical fiber 71 has, for example, a core that mainly transmits optical signals, a clad that surrounds the core, and a coating that reinforces and protects them. The core and the clad have refractive indices different from each other and are made of glass such as quartz or plastic, for example. The optical fiber 71 may have a reinforcing fiber layer, a sheath, etc., outward more.

The cable 70 including the optical fiber 71 may function as a mooring line for mooring the drone 60 on which the slave repeater 20 is mounted, or may have a feeder line for supplying electric power from the ground to the slave repeater 20. In case that the cable 70 has the feeder line, by supplying electric power from the battery or generator mounted on the automobile 50 to the slave repeater 20 and the flight drive section such as a motor that drives the propeller of the drone 60, the slave repeater 20 can stay in the upper airspace for a long time, and the slave repeater 20, which is the core of the radio relay system, can be operated for a long time.

In the present embodiment, although the slave repeater 20 is mounted on the drone 60 and stays in the upper airspace or obliquely upper airspace above the automobile 50, the slave repeater 20 may be mounted on a floating object such as a moored balloon to stay in the upper airspace or obliquely upper airspace above the automobile 50.

Figure 2:
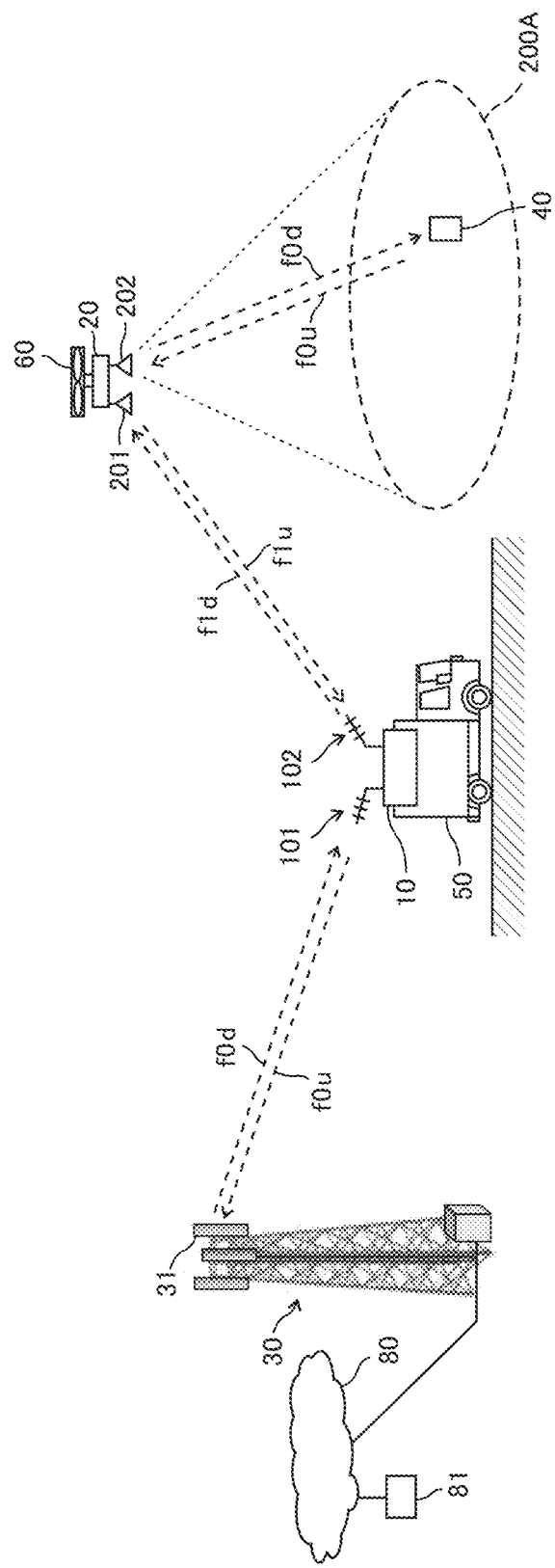
FIG. 2 is an illustration of a radio relay system according to a reference example.

FIG. 2 is an illustration of a radio relay system of a non-regenerative frequency conversion type repeater method according to a reference example. In the radio relay system according to the reference example shown in FIG. 2, the communication between the master repeater 10 and the slave repeater 20 is performed by radio communication using radio waves with frequencies (fld, flu) for relaying. The master repeater 10 has an antenna (antenna for slave repeater) 102 with directivity toward the slave repeater 20. The slave repeater 20 has an antenna (antenna for master repeater) 201 with directivity toward the master repeater 10.

In FIG. 2, the master repeater 10 converts the radio wave with frequency f0d received from the base station 30 to the radio wave with the frequency fld for relaying and transmits the radio wave to the slave repeater 20, and restores (converts) the radio wave with frequency flu for relaying received from the slave repeater 20, to the radio wave with the frequency f0u, and transmits the radio wave toward the base station 30. The slave repeater 20 restores (converts) the radio wave with the frequency f1d for relaying received from the master repeater 10, to the radio wave with frequency f0d, and transmits the radio wave toward the mobile station 40, and converts the radio wave with the frequency f0u received from the mobile station 40 to the radio wave with the frequency flu for relaying and transmits the radio wave toward the master repeater 10.

In the radio relay system in FIG. 2, since the signals are relayed by converting the signal frequencies to the frequencies fld and flu for relaying, even if a radio wave absorber is not inserted between the antennas 201 and 202 of the slave repeater 20, an interference due to a wraparound of radio wave of the same frequency between the antennas 201 and 202 is eliminated, and the slave repeater 20 can transmit with the maximum transmission power. Further, since the slave repeater 20 does not decode the baseband signal, the apparatus configuration becomes simple and lightweight.

However, in the radio relay system of FIG. 2, the radio frequencies fld and flu for relay are required for the communication between the master repeater 10 and the slave repeater 20.

On the other hand, in the radio relay system of the present embodiment, since the communication between the master repeater 10 and the slave repeater 20 is performed by the ROF using the optical fiber 71, the radio frequencies fld and flu for relay are unnecessary, and there is no interference due to the wraparound of radio wave of the same frequency.

Figure 3:
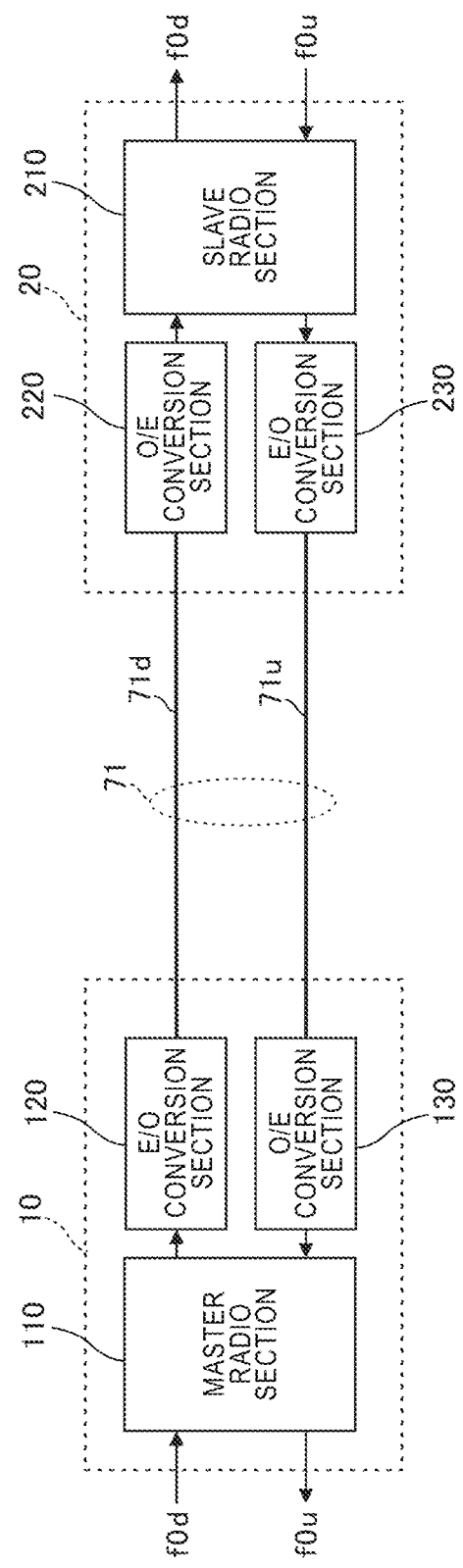
FIG. 3 is a block diagram showing an example of a configuration of main parts of a master repeater and a slave repeater of a radio relay system according to an embodiment.

FIG. 3 is a block diagram showing an example of a configuration of main parts of the master repeater 10 and the slave repeater 20 of the radio relay system according to the embodiment. The configuration example in FIG. 3 is an example of a radio relay system corresponding to the SISO (Single Input Single Output) with one transmission for each of the uplink and the downlink, in which one signal is transmitted in the direction for the mobile station (downlink) and one signal is transmitted in the direction for the base station (uplink).

In FIG. 3, the radio relay system according to the present embodiment is provided with the master repeater 10 mounted on the automobile 50 stopped at a position where it is capable of communicating with the base station 30, the slave repeater 20 mounted on the drone 60 staying in the upper airspace at a position where it is capable of communicating with the master repeater 10, and two optical fibers 71 (71d, 71u) that are media for optical communication between the master repeater 10 and the slave repeater 20.

The first optical fiber 71d transmits an optical signal (downstream optical signal) of the downlink (forward link) from the master repeater 10 to the slave repeater 20, and the second optical fiber 71u transmits an optical signal (upstream optical signal) of the uplink (reverse link) from the slave repeater 20 to the master repeater 10. Wavelengths of the downstream optical signals and the upstream optical signals (hereinafter also referred to as "optical wavelengths") are, for example, wavelengths in the S band (1460 to 1530 [nm]), C band (1530 to 1565 [nm]), L band (1565 to 1625 [nm]) or O band (1260 to 1360 [nm]), in which a transmission loss is relatively small. The wavelength $\lambda d$ of the downstream optical signal and the wavelength $\lambda u$ of the upstream optical signal may be the same wavelength or may be wavelengths different from each other.

The master repeater 10 is provided with a master radio section 110 as a network-side communication section having a function of communicating with the mobile communication network side, and electro-optical signal conversion sections (120, 130) of relay sources.

The master radio section 110, which is connected to the antenna (antenna for base station) 101 with directivity toward the base station, receives a downstream signal with the frequency f0d for the mobile station in the downlink and transmits a downstream signal with the frequency f0u for the base station in the uplink, via the antenna 101. The master radio section 110 is configured by using, for example, a high-frequency amplifier (AMP), a signal processing section, and the like.

In the downlink, the signal processing section of the master radio section 110 generates an intermediate signal with the frequency fc+f0d before performing a conversion to an optical signal, based on the downstream signal with the frequency f0d for the mobile station and the signal with a carrier frequency fc. In the uplink, the signal processing section generates an upstream signal with the frequency f0u for the base station, based on the intermediate signal with the frequency fc+f0u after performing the conversion from the optical signal, and the signal with the carrier frequency fc.

The signal processing section of the master radio section 110 is provided with, for example, a local oscillator, a multiplier (also referred to as "mixer") for each of the downlink and uplink, and a band-pass filter for each of the downlink and uplink. The local oscillator can be configured with a signal generator (SG) or the like, and generates a signal with a predetermined carrier frequency fc. The downlink multiplier multiplies the downstream signal with the frequency f0d for the mobile station by the signal with the carrier frequency fc. The uplink multiplier multiplies the intermediate signal with the frequency fc+f0u by the signal with the carrier frequency fc. The downlink band-pass filter passes only the intermediate signal with the frequency fc+f0d among the signals outputted from the downlink multiplier. The uplink band-pass filter passes only the upstream signal with the frequency f0u for the base station among the signals outputted from the uplink multiplier.

The electro-optical signal conversion section of relay source has an E/O conversion section 120 as a downstream-signal conversion section and an O/E conversion section 130 as an upstream-signal conversion section. The E/O conversion section 120 converts a downstream electrical signal (RF signal) for the mobile station 40, which is outputted from the master radio section 110, to a downstream optical signal with a predetermined downstream wavelength λd. The O/E conversion section 130 converts an upstream optical signal with the predetermined upstream wavelength λu to an upstream electrical signal (RF signal) for the base station 30 and outputs it to the master radio section 110. The E/O conversion section 120 is configured by using, for example, a light-emitting element such as an LD (Laser Diode), and the O/E conversion section 130 is configured by using, for example, a light-receiving element such as a PD (Photo Diode).

The slave repeater 20 is provided with a slave radio section 210 as a terminal-side communication section having a function of communicating with the mobile station (terminal apparatus) 40 side, and electro-optical signal conversion sections of relay destinations (220, 230).

The slave radio section 210, which is connected to an antenna (antenna for mobile station) 202 with directivity toward the cell 200A, receives an upstream signal with the frequency f0u for the base station in of the uplink and transmits a downstream signal with the frequency f0d for the mobile station in the downlink, via the antenna 202. The slave radio section 210 is configured by using, for example, a high-frequency amplifier (AMP), a signal processing section, and the like.

In the downlink, the signal processing section of the slave radio section 210 generates a downstream signal with the frequency f0d for the mobile station, based on the intermediate signal with the frequency fc+f0d after performing the conversion from the optical signal, and the signal with the carrier frequency fc. In the uplink, the signal processing section generates an intermediate signal with frequency fc+f0u before performing a conversion to an optical signal, based on the upstream signal with the frequency f0u for the base station and the signal with the carrier frequency fc.

The signal processing section of the slave radio section 210 is provided with, for example, a local oscillator, a multiplier for each of the downlink and uplink, and a band-pass filter for each of the downlink and the uplink. The local oscillator can be configured with a signal generator (SG) or the like, and generates a signal with the predetermined carrier frequency fc. The downlink multiplier multiplies the intermediate signal with the frequency fc+f0d by the signal with the carrier frequency fc. The uplink multiplier multiplies the upstream signal with the frequency f0u for the base station by the signal with the carrier frequency fc. The downlink band-pass filter passes only the downstream signal with the frequency f0d for the mobile station among the signals outputted from the downlink multiplier. The uplink band-pass filter passes only the intermediate signal with the frequency fc+f0u among the signals outputted from the uplink multiplier.

The electro-optical signal conversion section of relay destination has an E/O conversion section 230 as an upstream-signal conversion section and an O/E conversion section 220 as a downstream-signal conversion section. The E/O conversion section 230 converts an upstream electric signal (RF signal) for the base station 30, which is outputted from the slave radio section 210, to an upstream optical signal with the predetermined upstream wavelength λu. The O/E conversion section 220 converts a downstream optical signal with the predetermined downstream wavelength λd to a downstream electrical signal (RF signal) for the mobile station 40 and outputs the downstream electrical signal to the slave radio section 210. The E/O conversion section 230 is configured by using, for example, a light emitting element such as an LD, and the O/E conversion section 220 is configured using, for example, a light receiving element such as a PD.

In the configuration example of the radio relay system in FIG. 3, the E/O conversion section 120 and the O/E conversion section 130 of the master repeater 10, the O/E conversion section 220 and the E/O conversion section 230 of the slave repeater 20, and the optical fibers 71 (71d, 71u) constitute the ROF system that is part of the radio relay system.

In the configuration example of FIG. 3, as for both the master repeater 10 and the slave repeater 20, the number of the E/O conversion section and the O/E conversion section is one, respectively. Since two optical fibers (optical fiber 71d for downlink and optical fiber 71u for uplink) are used, as for both the master repeater 10 and the slave repeater 20, neither the master repeater 10 nor the slave repeater 20 requires a wavelength-division multiplex connection section (WDM: Wavelength Division Multiplexing) for bundling plural optical signals.

Figure 4:
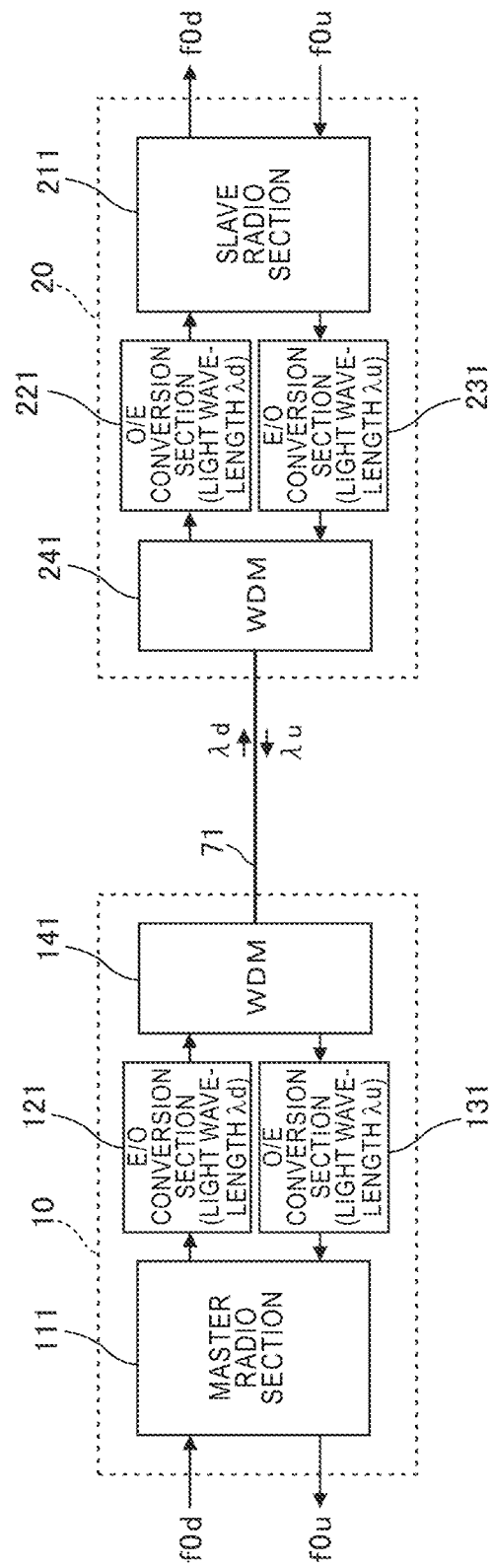
FIG. 4 is a block diagram showing another example of a configuration of main parts of a master repeater and a slave repeater of a radio relay system according to an embodiment.

FIG. 4 is a block diagram showing another example of the configuration of main parts of the master repeater 10 and the slave repeater 20 of the radio relay system according to the embodiment. The configuration example in FIG. 4 is, like the configuration example in FIG. 3, an example of a radio relay system corresponding to the SISO with one transmission for each of the uplink and the downlink, in which one signal is transmitted in the direction for the mobile station (downlink) and one signal is transmitted in the direction for the base station (uplink). Hereinafter, the configuration different from that of FIG. 3 is mainly described.

In FIG. 4, the radio relay system according to the present embodiment is provided with the master repeater 10, the slave repeater 20, and the single optical fiber 71 common to the uplink and downlink lines, which is a medium for optical communication between the master repeater 10 and the slave repeater 20.

The optical fiber 71 transmits an optical signal (downstream optical signal with wavelength λd) of the downlink (forward link) from the master repeater 10 to the slave repeater 20, and also transmits an optical signal (upstream optical signal with wavelength λu) of the uplink (reverse link) from the slave repeater 20 to the master repeater 10. The wavelength λd of the downstream optical signal and the wavelength λu of the upstream optical signal are wavelengths different from each other.

The master repeater 10 is provided with a master radio section 111, electro-optical signal conversion sections of radio source (121, 131), and a WDM 141 having a function as an optical directional coupler. The configuration of the master radio section 111 is the same as the configuration of the master radio section 110 in FIG. 3 described above.

The electro-optical signal conversion section of relay source has E/O conversion sections 121 and 131 as downstream signal conversion sections, and an O/E conversion section 131 as an upstream signal conversion section. The E/O conversion section 121 converts a downstream electrical signal (RF signal) for the mobile station 40, which is outputted from the master radio section 110, to a downstream optical signal with the predetermined downstream wavelength λd. The O/E conversion section 131 converts an upstream optical signal with the predetermined upstream wavelength λu different from the downstream wavelength ad to an upstream electrical signal (RF signal) for the base station 30, and outputs the upstream electrical signal to the master radio section 111.

The WDM 141 injects the downstream optical signal with the downstream wavelength λd, which is outputted from the E/O conversion section 121, into the transmission-path edge section of the optical fiber 71. The WDM 141 inputs the upstream optical signal with the upstream wavelength λu, which is emitted from the transmission-path edge section of the optical fiber 71, into the master radio section 111.

The slave repeater 20 is provided with a slave radio section 211, electro-optical signal conversion sections of relay destinations (221, 231), and a WDM 241 having a function as an optical directional coupler. The configuration of the slave radio section 211 is the same as the configuration of the slave radio section 210 in FIG. 3 described above.

The electro-optical signal conversion section of relay destination has an E/O conversion section 231 as an upstream signal conversion section and an O/E conversion section 221 as a downstream signal conversion section. The E/O conversion section 231 converts the upstream electric signal (RF signal) for the base station 30, which is outputted from the slave radio section 211, to an upstream optical signal configured with the predetermined upstream wavelength λu. The O/E conversion section 221 converts a downstream optical signal with the predetermined downstream wavelength λd different from the upstream wavelength λu to a downstream electrical signal (RF signal) for the mobile station 40, and outputs the downstream electrical signal to the slave radio section 211.

The WDM 241 injects the upstream optical signal with the upstream wavelength λu, which is outputted from the E/O conversion section 231, into the transmission-path edge section of the optical fiber 71. The WDM 241 inputs the downstream optical signal with the downstream wavelength λd, which is emitted from the transmission-path edge section of the optical fiber 71, into the O/E conversion section 221.

In the configuration example of the radio relay system in FIG. 4, the E/O conversion section 121, the O/E conversion section 131 and the WDM 141 of the master repeater 10, and the O/E conversion section 221, the E/O conversion section 231 and the WDM 241 of the slave repeater 20, and the optical fiber 71 constitute the ROF system that is part of the radio relay system.

In the configuration example of FIG. 4, as for both the master repeater 10 and the slave repeater 20, the number of the E/O conversion section and the O/E conversion section with optical wavelengths different from each other is one, respectively. Although the WDMs 141 and 241 are required, which respectively have a function as an optical directional coupler and bundles two waves of optical signals, the optical transmission medium can be configured with the single optical fiber 71 that is common to the downlink and uplink lines.

As described above, according to the configuration example in FIG. 4, by optically multiplexing the downlink signal (f0d) and the uplink signal (f0u) using the optical elements (E/O conversion sections 121, 231 and O/E conversion sections 131, 221) with the wavelengths (λd, λu) different from each other, it is possible to relay the signals with the single optical fiber 71.

Figure 5:
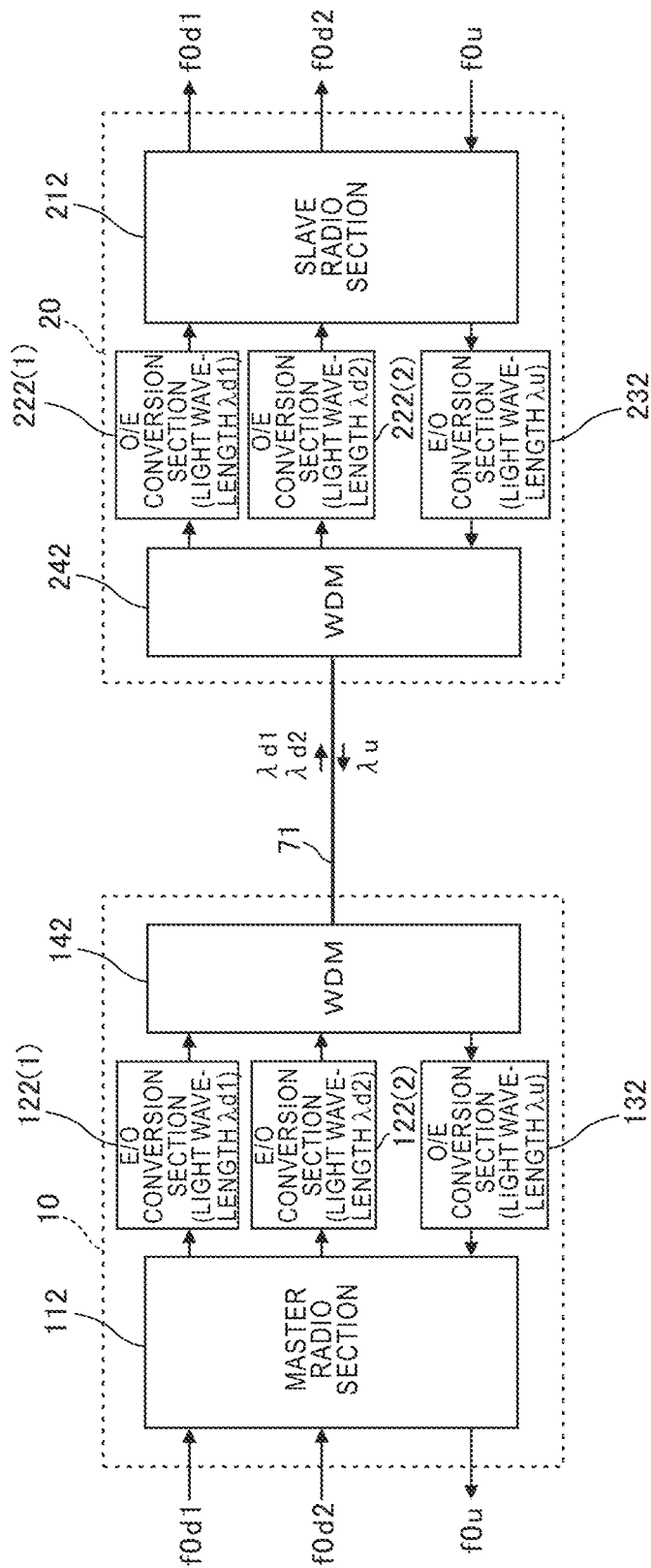
FIG. 5 is a block diagram showing yet another example of a configuration of main parts of a master repeater and a slave repeater of a radio relay system according to an embodiment.

FIG. 5 is a block diagram showing yet another example of the configuration of main parts of the master repeater 10 and the slave repeater 20 of the radio relay system according to the embodiment. The configuration example in FIG. 5 is an example of a radio relay system supporting two transmissions for the downlink and one transmission for the uplink, in which the transmission in the direction for the mobile station (downlink) is the MIMO transmission that uses the same frequency to transmit two signals simultaneously, and transmission in the direction for the base station (uplink) is one signal transmission. Hereinafter, the configuration different from that of FIG. 3 is mainly described.

In FIG. 5, the radio relay system according to the present embodiment is provided with the master repeater 10, the slave repeater 20, and the single optical fiber 71 common to the uplink and downlink lines which is a medium for optical communication between the master repeater 10 and the slave repeater 20.

The optical fiber 71 transmits two optical signals (downstream optical signals with two wavelengths λd1 and λd2) of the downlink (forward link) from the master repeater 10 to the slave repeater 20, and also transmits one optical signal (upstream optical signal with wavelength λu) of the uplink (reverse link) from the slave repeater 20 to the master repeater 10. The first downstream wavelength λd1 of the first downstream optical signal, the second downstream wavelength λd2 of the second downstream optical signal and the upstream wavelength λu of the upstream optical signal are wavelengths different from each other.

The master repeater 10 is provided with a master radio section 112, electro-optical signal conversion sections of relay source (122(1), 122(2), 132), and a WDM 142 having a function as an optical directional coupler and a multiplexing function for bundling optical signals.

The master radio section 112, which is connected to an antenna (antenna for base station) 101 with directivity toward the base station, receives a first downstream signal with a frequency f0d1 for the mobile station and a second downstream signal with a frequency f0d2 for the mobile station of the downlink and transmits a downstream signal with the frequency f0u for the base station of the uplink, via the antenna. The master radio section 112 is configured by using, for example, a high frequency amplifier (AMP), a signal processing section, and the like.

In the downlink, the signal processing section of the master radio section 112 generates an intermediate signal with a frequency fc+f0d1 before performing a conversion to an optical signal, based on the first downstream signal with the frequency f0d1 for the mobile station and the signal with the carrier frequency fc. Furthermore, in the downlink, the signal processing section generates an intermediate signal with a frequency fc+f0d2 before performing a conversion to an optical signal, based on the second downstream signal with the frequency f0d2 for the mobile station and the signal with the carrier frequency fc. In the uplink, the signal processing section generates an upstream signal with the frequency f0u for the base station, based on the intermediate signal with the frequency fc+f0u after performing the conversion from the optical signal, and the signal with the carrier frequency fc.

The signal processing section of the master radio section 110 is provided with, for example, a local oscillator, a first multiplier and a second multiplier of the downlink, a multiplier of the uplink, a first band-pass filter and a second band-pass filter of the downlink, and a band-pass filter of the uplink. The local oscillator can be configured with a signal generator (SG) or the like, and generates a signal with a predetermined carrier frequency fc.

The first multiplier of the downlink multiplies the first downstream signal with the frequency f0d1 for the mobile station by the signal with the carrier frequency fc, and the second multiplier multiplies the second downstream signal with the frequency f0d2 for the mobile station by the signal with the carrier frequency fc. The multiplier of the uplink multiplies the intermediate signal with the frequency fc+f0u by the signal with the carrier frequency fc. The first band-pass filter of the downlink passes only the intermediate signal with the frequency fc+f0d1 among the signals outputted from the first multiplier, and the second band-pass filter passes only the intermediate signal with the frequency fc+f0d2 among the signals outputted from the second multiplier. The band-pass filter of the uplink passes only the upstream signal with the frequency f0u for the base station among the signals outputted from the multiplier of the uplink.

The electro-optical signal conversion section of relay source has a first E/O conversion section 122(1) and a second E/O conversion section 122(2) as downstream-signal conversion sections, and an O/E conversion section 132 as an upstream-signal conversion section. The first E/O conversion section 122(1) converts a first downstream electrical signal (RF signal) with the first downstream frequency fd1 for the mobile station 40, which is outputted from the master radio section 112, to a first downstream optical signal with the predetermined first downstream wavelength λd1. The second E/O conversion section 122(2) converts a second downstream electrical signal (RF signal) with the second downstream frequency fd2 for the mobile station 40, which is outputted from the master radio section 112, to a second downstream optical signal with the predetermined second downstream wavelength λd2. The O/E conversion section 132 converts an upstream optical signal with the predetermined upstream wavelength λu different from each of the first downstream wavelength λd1 and the second downstream wavelength λd2 to an upstream electrical signal (RF signal) with an upstream frequency f0u for the base station 30, and outputs the converted signal to the master radio section 110.

The WDM 142 multiplexes the first downstream optical signal with the first downstream wavelength λd1 outputted from the first E/O conversion section 122(1) and the second downstream optical signal with the second downstream wavelength λd2 outputted from the second E/O conversion section 122(2), and injects the multiplexed optical signal into the transmission-path edge section of the optical fiber 71. The WDM 142 inputs the upstream optical signal with the upstream wavelength λu, which is emitted from the transmission-path edge section of the optical fiber 71, into the O/E conversion section 132.

The slave repeater 20 is provided with a slave radio section 212, electro-optical signal conversion sections of relay destination (222(1), 222(2), 232), and a WDM 242 having a function as an optical directional coupler and a multiplexing function for bundling optical signals.

The slave radio section 212, which is connected to the antenna (antenna for mobile station) 202 with directivity toward the cell 200A, receives an upstream signal with the frequency f0u for the base station of the uplink and transmits a downstream signal with the frequency f0d for the mobile station of the downlink, via the antenna. The slave radio section 210 is configured by using, for example, a high-frequency amplifier (AMP), a signal processing section, and the like.

In the downlink, the signal processing section of the slave radio section 212 generates a first downstream signal with the frequency f0d1 for the mobile station, based on the intermediate signal with the frequency fc+f0d1 after performing the conversion from the optical signal, and the signal with the carrier frequency fc. The signal processing section generates a second downstream signal with the frequency f0d2 for the mobile station, based on the intermediate signal with the frequency fc+f0d2 after performing the conversion from the optical signal, and the signal with the carrier frequency fc. Further, in the uplink, the signal processing section generates an intermediate signal with the frequency fc+f0u before performing the conversion to an optical signal, based on the upstream signal with the frequency f0u for the base station and the signal with the carrier frequency fc.

The signal processing section of the slave radio section 212 is provided with, for example, a local oscillator, a first multiplier and a second multiplier of the downlink, a multiplier of the uplink, a first band-pass filter and a second band-pass filter of the downlink, and a band-pass filter of the uplink. The local oscillator can be configured with a signal generator (SG) or the like, and generates a signal with the predetermined carrier frequency fc.

The first multiplier of the downlink multiplies the intermediate signal with the frequency fc+f0d1 by the signal with the carrier frequency fc, and the second multiplier multiplies the intermediate signal with the frequency fc+f0d2 by the signal with the carrier frequency fc. The multiplier of the uplink multiplies the upstream signal with the frequency f0u for the base station by the signal with the carrier frequency fc. The first band-pass filter of the downlink passes only the first downstream signal with the frequency f0d1 for the mobile station among the signals outputted from the first multiplier, and the second band-pass filter passes only the second downstream signal with the f0d2 frequency for the mobile station among the signals outputted from the second multiplier. The band-pass filter of the uplink passes only the intermediate signal with the frequency fc+f0u among the signals outputted from the multiplier of the uplink.

The electro-optical signal conversion section of relay destination has an E/O conversion section 232, a first O/E conversion section 222(1), and a second O/E conversion section 222(2). The E/O conversion section 232 converts an upstream electrical signal (RF signal) with the upstream frequency f0u for the base station 30, which is outputted from the slave radio section 212, to an upstream optical signal with the predetermined upstream wavelength λu. The first O/E conversion section 222(1) converts a first downstream optical signal with the predetermined first downstream wavelength λd1 different from the upstream wavelength λu to a first downstream electrical signal (RF signal) with the downstream frequency f0d1 for the mobile station 40, and outputs the converted electric signal to the slave radio section 212. The first O/E conversion section 222(1) converts a first downstream optical signal with the predetermined first downstream wavelength λd1 different from the upstream wavelength λu to a first downstream electrical signal configured with a downstream frequency f0d1 for the mobile station 40. The second O/E conversion section 222(2) converts a second downstream optical signal with the predetermined second downstream wavelength λd2 different from the upstream wavelength λu and the first downstream wavelength λd1 to a second downstream electric signal (RF signal) with the frequency f0d2 for the mobile station 40, and outputs the converted electric signal to the slave radio section 212.

The WDM 242 injects the upstream optical signal with the upstream wavelength λu, which is outputted from the E/O conversion section 232, into the transmission-path edge section of the optical fiber 71. The WDM 242 inputs the first downstream optical signal with the first downstream wavelength λd1, which is emitted from the transmission-path edge section of the optical fiber 71, to the first O/E conversion section 222(1), and also inputs the second downstream optical signal with the second downstream wavelength λd2, which is emitted from the transmission-path edge section of the optical fiber 71, to the second O/E conversion section 222(2).

In the configuration example of the radio relay system in FIG. 5, the E/O conversion sections 122(1) and 122(2), the O/E conversion section 132 and the WDM 142 of the master repeater 10, the O/E conversion sections 222(1) and 222(2), the E/O conversion section 232 and WDM 242 of the slave repeater 20, and the optical fiber 71 constitute the ROF system that is part of the radio relay system.

In the configuration example of FIG. 5, as for the master repeater 10, the number of E/O conversion sections with optical the wavelengths different from each other is two, and the number of O/E conversion section is one. As for the slave repeater 20, the number of E/O conversion sections with the optical wavelengths different from each other is two, and the number of O/E conversion section is one. Although the WDMs 142 and 242 are required, which respectively have a function as an optical directional coupler and bundles two waves of optical signals, a single optical fiber common to the downlink and uplink lines is sufficient as an optical transmission medium.

As described above, according to the configuration example of FIG. 5, in the radio relay system in which the downlink is the MIMO transmission that uses the same frequency to transmit two signals (f0d1, f0d2) simultaneously and one signal (f0u) is transmitted in the uplink, by optically multiplexing the two downlink signals (f0d1, f0d2) and the uplink signal (f0u) using optical elements (E/O conversion sections 122(1), 122(2), 232 and O/E conversion sections 132, 222(1), 222(2)) with the wavelengths ($\lambda$d1, $\lambda$d2, $\lambda$u) different from each other, it is possible to relay the signals by the single optical fiber 71.

In the configuration example of FIG. 5, the MIMO transmission may be used for the uplink, in which two signals (f0u1, f0u2) are transmitted simultaneously using the same frequency. In this case, for example, the master repeater 10 is separately provided with an O/E conversion section for the optical wavelength $\lambda$u1 and an O/E conversion section for the optical wavelength $\lambda$u2 so as to support the two upstream signals (f0u1, f0u2), and the slave repeater 20 is separately provided with an E/O conversion section for the optical wavelength $\lambda$u1 and an E/O conversion section for the optical wavelength $\lambda$u2 so as to support the two upstream signals (f0u1, f0u2).

In the configuration example of FIG. 5, the downlink may be the MIMO transmission in which three or more signals (f0d1, f0d2, f0d3, . . . ) are transmitted simultaneously using the same frequency, and the uplink may be the MIMO transmission in which three or more signals (f0u1, f0u2, f0u3, . . . ) are transmitted simultaneously using the same frequency. In this case, for example, the master repeater 10 is separately provided with plural E/O conversion sections for three or more optical wavelengths ($\lambda$d1, $\lambda$d2, $\lambda$d3, . . . ) different from each other so as to support three or more downstream signals (f0d1, f0d2, f0d3, . . . ), and the slave repeater 20 is separately provided with plural O/E conversion section for three or more optical wavelengths ($\lambda$d1, $\lambda$d2, $\lambda$d3, . . . ) different from each other so as to support three or more downstream signals (f0d1, f0d2, f0d3, . . . ). Moreover, the master repeater 10 is separately provided with plural O/E conversion sections for three or more optical wavelengths ($\lambda$u1, $\lambda$u2, $\lambda$u3, . . . ) different from each other so as to support three or more upstream signals (f0u1, f0u2, f0u3, . . . ), and the slave repeater 20 is separately provided with plural E/O conversion sections for three or more optical wavelengths ($\lambda$u1, $\lambda$u2, $\lambda$u3, . . . ) different from each other so as to support three or more upstream signals (f0u1, f0u2, f0u3, . . . ).

Figure 6:
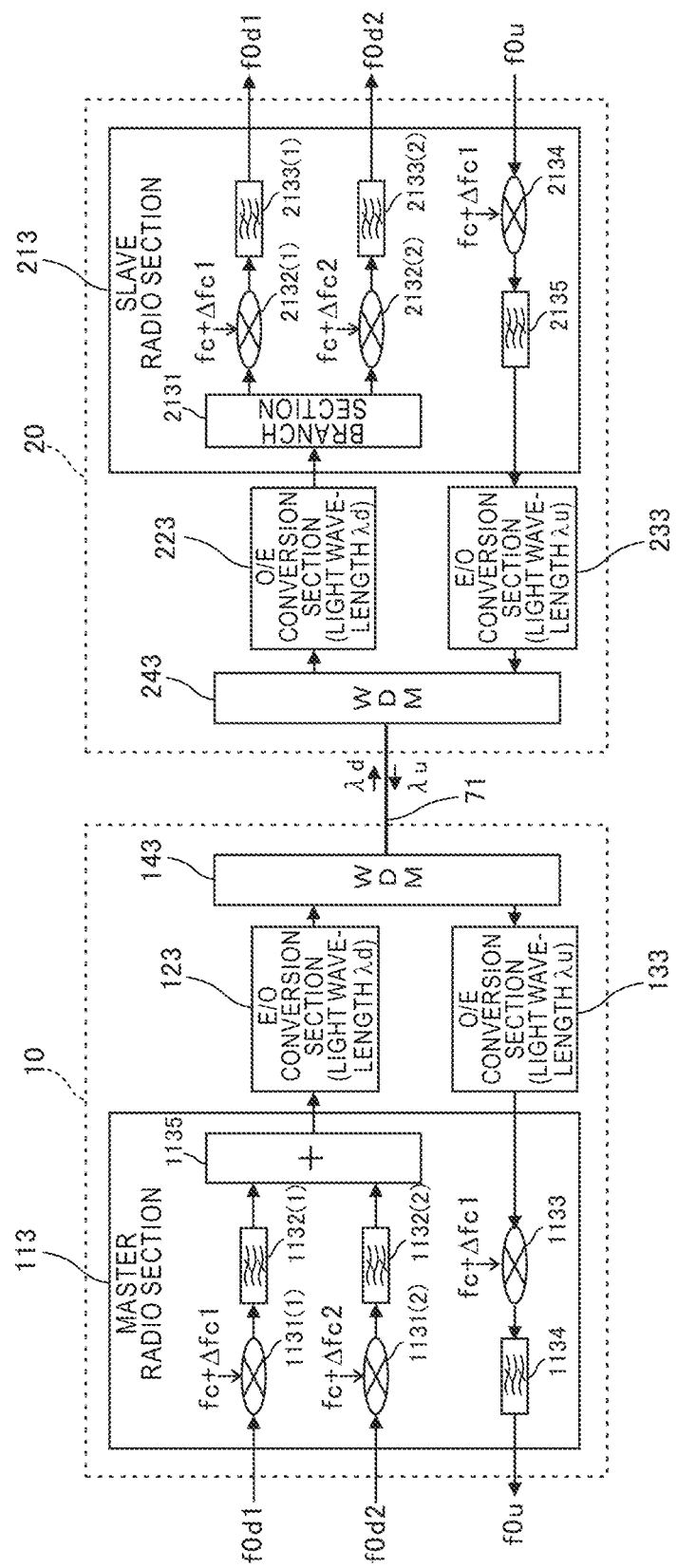
FIG. 6 is a block diagram showing yet another example of a configuration of main parts of a master repeater and a slave repeater of a radio relay system according to an embodiment.

FIG. 6 is a block diagram showing yet another example of the configuration of main parts of the master repeater 10 and the slave repeater 20 of the radio relay system according to the embodiment. The configuration example in FIG. 6, like the configuration example in FIG. 5, is an example of a radio relay system supporting two transmissions for downlink and one transmission for uplink, in which the transmission in the direction toward the mobile station (downlink) is the MIMO transmission that uses the same frequency to transmit two signals simultaneously, and the transmission in the direction toward the base station (uplink) is one signal transmission. Hereinafter, the configuration different from that of FIG. 3 is mainly described.

In FIG. 6, the radio relay system according to the present embodiment is provided with the master repeater 10, the slave repeater 20, and the single optical fiber 71 common to the uplink and downlink lines which is an optical communication medium between the master repeater 10 and the slave repeater 20.

The optical fiber 71 transmits two optical signals (downstream optical signals with wavelength $\lambda$d) of the downlink (forward link) from the master repeater 10 to the slave repeater 20, and also transmits one optical signal (upstream optical signal with wavelength $\lambda$u) of the uplink (reverse link) from the slave repeater 20 to the master repeater 10. The downstream wavelength $\lambda$d of the downstream optical signal and the upstream wavelength $\lambda$u of the upstream optical signal are wavelengths different from each other.

The master repeater 10 is provided with a master radio section 113, electro-optical signal conversion sections of relay sources (123, 133), and a WDM 143 having a function as an optical directional coupler.

The master radio section 113, which is connected to the antenna (antenna for base station) 101 with directivity toward the base station, receives the first downstream signal with the frequency f0d1 for the mobile station and the second downstream signal with the frequency f0d2 for the mobile station of the downlink and transmits the downstream signal with the frequency f0u for the base station of the uplink, via the antenna 101. The master radio section 113 is configured using, for example, a high frequency amplifier (AMP), a signal processing section, and the like.

In the downlink, the signal processing section of the master radio section 113 generates an intermediate signal with a frequency fc+$\Delta$fc1+f0d1 before performing a conversion to the optical signal, based on the first downstream signal with the frequency f0d1 for the mobile station and the signal with the first carrier frequency fc+$\Delta$fc1. In the downlink, the signal processing section generates an intermediate signal with a frequency fc+$\Delta$fc2+f0d2 before performing a conversion to the optical signal, based on the second downstream signal with the frequency f0d2 for the mobile station and the signal with the second carrier frequency fc+$\Delta$fc2. Further, in the uplink, the signal processing section generates an upstream signal with the frequency f0u for the base station, based on the intermediate signal with the frequency fc+$\Delta$fc1+f0u after performing a conversion from the optical signal, and the signal with the first carrier frequency fc+$\Delta$fc1.

The signal processing section of the master radio section 113 is provided with, for example, a local oscillator, a first multiplier 1131(1) and a second multiplier 1131(2) of the downlink, a multiplier 1133 of the uplink, a first band-pass filter 1132(1) and a second band-pass filter 1132(2) of the downlink, a band-pass filter 1134 of the uplink, and a signal addition section 1135, as shown in FIG. 6.

The local oscillator can be configured with a signal generator (SG) for generating a signal with the first carrier frequency fc+Δfc1 and a signal with the second carrier frequency fc+Δfc2 which are different frequencies each other, or the like.

The first multiplier 1131(1) of the downlink multiplies the first downstream signal with the frequency f0d1 for the mobile station by the signal with the first carrier frequency fc+Δfc1, and the second multiplier 1131(2) multiplies the second downstream signal with the frequency f0d2 for the mobile station by the signal with the second carrier frequency fc+Δfc2. The multiplier 1133 of the uplink multiplies the intermediate signal with the frequency fc+Δfc1+f0u by the signal with the first carrier frequency fc+Δfc1. The first band-pass filter 1132(1) of the downlink passes only the intermediate signal with the frequency fc+Δfc1+f0d1 among the signals outputted from the first multiplier 1131(1), and the second band-pass filter 1132(2) passes only the intermediate signal with the frequency fc+Δfc1+f0d2 among the signals outputted from the second multiplier 1131(2). The band-pass filter 1134 of the uplink passes only the upstream signal with the frequency f0u for the base station among the signals outputted from the multiplier 1133 of the uplink.

The signal addition section 1135 adds together the intermediate signal with the frequency fc+Δfc1+f0d1 and the intermediate signal with the frequency fc+Δfc1+f0d2, in which the frequencies are different from each other, and outputs the added downstream signal that is targeted for transmission to the E/O conversion section 123.

The electro-optical signal conversion section of relay source has an E/O conversion section 123 as a downstream signal conversion section and an O/E conversion section 133 as an upstream signal conversion section. The E/O conversion section 123 converts the aforementioned downstream signal to be transmitted, which is outputted from the master radio section 113, to a downstream optical signal with the predetermined downstream wavelength λd. The O/E conversion section 133 converts the upstream optical signal with the upstream wavelength λu, which is transmitted from the slave repeater 20, to an intermediate signal with the frequency fc+Δfc1+f0u corresponding to the upstream electrical signal (RF signal) with the upstream frequency f0u for the base station 30, and outputs the converted intermediate signal to the master radio section 113.

The WDM 143 injects the downstream optical signal with the downstream wavelength λd, which is outputted from the E/O conversion section 123, to the transmission-path edge section of the optical fiber 71. The WDM 143 inputs the upstream optical signal with the upstream wavelength λu, which is emitted from the transmission-path edge section of the optical fiber 71, into the O/E conversion section 133.

The slave repeater 20 is provided with a slave radio section 213, electro-optical signal conversion sections for relay destinations (223, 233), and a WDM 243 having a function as an optical directional coupler.

The slave radio section 213, which is connected to the antenna (antenna for mobile station) 202 with directivity toward the cell 200A, receives an upstream signal with the frequency f0u for the base station of the uplink and transmits a first downstream signal with the frequency f0d1 for the mobile station and a second downstream signal with the frequency f0d2 for the mobile station of the downlink, via the antenna 202. The slave radio section 213 is configured by using, for example, a high frequency amplifier (AMP), a signal processing section, and the like.

In the downlink, the signal processing section of the slave radio section 213 generates a first downstream signal with the frequency f0d1 for the mobile station, based on the intermediate signal with the frequency fc+Δfc1+f0d1 after performing a conversion from the optical signal, and the signal with the carrier frequency fc+Δfc1. The signal processing section generates a second downstream signal with the frequency f0d2 for the mobile station, based on the intermediate signal with the frequency fc+Δfc2+f0d2 after performing a conversion from the optical signal, and the signal with the carrier frequency fc+Δfc2. Further, in the uplink, the signal processing section generates an intermediate signal with the frequency fc+Δfc1+f0u before performing a conversion to the optical signal, based on the upstream signal with the frequency f0u for the base station and the signal with the carrier frequency fc+Δfc1.

The signal processing section of the slave radio section 213 is provided with, for example, a branch section 2131, a local oscillator, a first multiplier 2132(1) and a second multiplier 2132(2) of the downlink, a multiplier 2134 of the uplink, a first band-pass filter 2133(1) and a second band-pass filter 2133(2) of the downlink, and a band-pass filter 2135 of the uplink, as shown in FIG. 6.

The local oscillator may be configured with a signal generator (SG) for generating a signal with the first carrier frequency fc+Δfc1 and a signal with the second carrier frequency fc+Δfc2, in which the frequencies are different from each other, and the like.

The branch section 2131 branches a reception signal including two downstream signals corresponding to the downstream electric signals (RF signals) with the two downstream frequencies f0d1 and f0d2 for the mobile station 40, which is outputted from the O/E conversion section 223.

The first multiplier 2132(1) of the downlink multiplies the intermediate signal with the frequency fc+Δfc1+f0d1 by the signal with the first carrier frequency fc+Δfc1, and the second multiplier 2132(2) multiplies the intermediate signal with the frequency fc+Δfc2+f0d2 by the signal with the second carrier frequency fc+Δfc2. The multiplier 2134 of the uplink multiplies the upstream signal with the frequency f0u for the base station by the signal with the first carrier frequency fc+Δfc1. The first band-pass filter 2133(1) of the downlink passes only the first downstream signal with the frequency f0d1 for the mobile station among the signals outputted from the first multiplier 2132(1), and the second band-pass filter 2133(2) passes only the second downstream signal with the frequency f0d2 for the mobile station among the signals outputted from the second multiplier 2132(2). The band-pass filter 2135 of the uplink passes only the intermediate signal with the frequency fc+Δfc1+f0u among the signals outputted from the multiplier 2134 of the uplink.

The electro-optical signal conversion section of relay destination has an O/E conversion section 223 as a downstream signal conversion section and an E/O conversion section 233 as an upstream signal conversion section. The O/E conversion section 223 converts the downstream optical signal with the downstream wavelength λd, which is transmitted from the master repeater 10, to a reception signal including the two downstream signals corresponding to the downstream electrical signals (RF signals) with the two downstream frequencies f0d1 and f0d2 for the mobile station 40, and transmits the converted reception signal to the slave radio section 213. The E/O conversion section 233 converts the upstream signal to be transmitted, which is outputted from the slave radio section 213, to an upstream optical signal with the predetermined upstream wavelength λu.

The WDM 243 injects the upstream optical signal with upstream wavelength λu, which is outputted from the E/O conversion section 233, into the transmission-path edge section of the optical fiber 71. The WDM 243 inputs the downstream optical signal with downstream wavelength λd, which is emitted from the transmission-path edge section of the optical fiber 71, into the O/E conversion section 223.

In the configuration example of the radio relay system in FIG. 6, the E/O conversion section 123, the O/E conversion section 133 and the WDM 143 of the master repeater 10, the O/E conversion section 223, the E/O conversion section 233 and the WDM 243 of the slave repeater 20, and the optical fiber 71 constitute the ROF system that is part of the radio relay system.

In the configuration example of FIG. 6, as for both the master repeater 10 and the slave repeater 20, the number of the E/O conversion section and the O/E conversion section with the optical wavelengths different from each other is one, respectively. Although the WDMs 143 and 243 are required, which respectively have a function as an optical directional coupler and bundles two waves of optical signals, a single optical fiber common to the downlink and uplink lines is sufficient as an optical transmission medium.

As described above, according to the configuration example in FIG. 6, in the radio relay system in which the downlink is the MIMO transmission that uses the same frequency to transmit two signals (f0d1, f0d2) simultaneously and one signal (f0u) is transmitted in the uplink, by adding together the two downlink signals with the frequencies (f0d1, f0d2) while differing by a predetermined frequency so as not to overlap each other and regarding the frequencies as one frequency-multiplexed downstream radio frequency, and optically multiplexing one downlink signal and one uplink signal using optical elements (E/O conversion sections 123, 233 and O/E conversion sections 133, 223) with the wavelengths (λd, λu) different from each other, it is possible to relay the signals by the single optical fiber 71.

In the configuration example of FIG. 6, the MIMO transmission may be used for the uplink, in which two signals (f0u1, f0u2) are transmitted simultaneously using the same frequency. In this case, the signal processing section of the uplink in the master radio section 113 may be configured in the same manner as the signal processing section of the downlink in the slave radio section 213, and the signal processing section of the uplink in the slave radio section 213 may be configured in the same manner as the signal processing section of the downlink in the master radio section 113.

Figure 7:
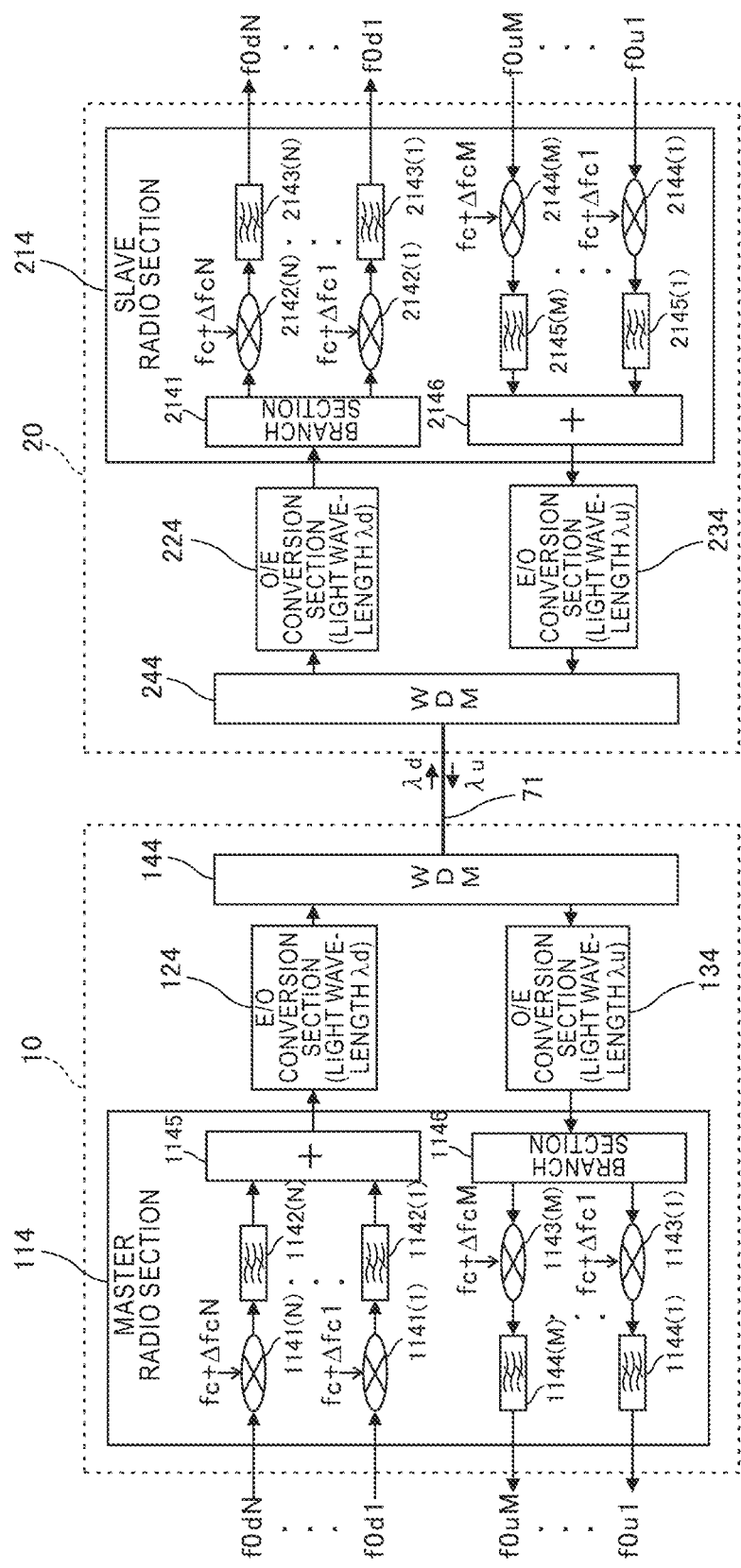
FIG. 7 is a block diagram showing yet another example of a configuration of main parts of a master repeater and a slave repeater of a radio relay system according to an embodiment.

FIG. 7 is a block diagram showing yet another example of the configuration of main parts of the master repeater 10 and the slave repeater 20 of the radio relay system according to the embodiment. The configuration example in FIG. 7 is an example of a radio relay system supporting N transmissions for downlink and M transmissions for uplink, in which the transmission in the direction toward the mobile station (downlink) is the MIMO transmission that uses the same frequency to transmit the N signals simultaneously, and the transmission in the direction toward the base station (uplink) is the MIMO transmission that uses the same frequency to transmit M signals simultaneously. Hereinafter, the configuration different from that of FIG. 3 is mainly described.

In FIG. 7, the radio relay system according to the present embodiment is provided with the master repeater 10, the slave repeater 20, and the single optical fiber 71 common to the uplink and downlink lines which is a medium for optical communication between the master repeater 10 and the slave repeater 20.

The optical fiber 71 transmits two optical signals (downstream optical signals with wavelength λd) of the downlink (forward link) from the master repeater 10 to the slave repeater 20, and also transmits one optical signal (upstream optical signal with wavelength λu) of the uplink (reverse link) from the slave repeater 20 to the master repeater 10. The downstream wavelength λd of the downstream optical signal and the upstream wavelength λu of the upstream optical signal are wavelengths different from each other.

The master repeater 10 is provided with a master radio section 114, electro-optical signal conversion sections (124, 134) of relay sources, and a WDM 144 having a function as an optical directional coupler.

The master radio section 114, which is connected to the antenna (antenna for base station) 101 with directivity toward the base station, receives downstream signals with plural (N) frequencies f0dn (n=1 to N) for the mobile stations of the downlink and transmits downstream signals with plural (M) frequencies f0um (m=1 to M) for base stations of the uplink, via the antenna 101. The master radio section 114 is configured by using, for example, a high-frequency amplifier (AMP), a signal processing section, and the like.

In the following description of FIG. 7, "n" (n=1 to N) is added as a reference sign for identifying the plural (N) signals and configurations of the downlink, and "m" (m=1 to M) is added as a reference sign for identifying the plural (M) signals and configurations of the uplink.

In the following configuration example of FIG. 7, the number of downlink signals (N) may be 2, 4 or 8 and the number of uplink signals (M) may be 2, 4 or 8. The number of downlink signals (N) and the number of uplink signals (M) may be the same or different from each other.

In the downlink, the signal processing section of the master radio section 114 generates an intermediate signal with a frequency fc+Δfcn+f0dn before performing a conversion to an optical signal, based on a downstream signal with a frequency f0dn for the mobile station and a signal with a carrier frequency fc+Δfcn. In the uplink, the signal processing section generates an upstream signal with a frequency f0um for the base station, based on an intermediate signal with a frequency fc+Δfcm+f0um after performing a conversion from the optical signal and the signal with the carrier frequency fc+Δfcm.

The signal processing section of the master radio section 114 is provided with, for example, a local oscillator, plural multipliers 1141(n) of the downlink, plural multipliers 1143(m) of the uplink, plural band-pass filters 1142(n) of the downlink, plural band-pass filters 1144(m) of the uplink, a signal addition section 1145, and a branch section 1146, as shown in FIG. 7.

The local oscillator can be configured with a signal generator (SG) for generating a plurality of signals with the carrier frequencies fc+Δfcn and signals with the carrier frequencies fc+Δfcm, in which the frequencies are different from each other, or the like.

The multiplier 1141(n) of the downlink multiplies the downstream signal with the frequency f0dn for the mobile station by the signal with the carrier frequency fc+Δfcn. The multiplier 1143(m) of the uplink multiplies the intermediate signal with the frequency fc+Δfcm+f0um by the signal with the carrier frequency fc+Δfcm. The band-pass filter 1142(n) of the downlink passes only the intermediate signal with the frequency fc+Δfcn+f0dn among the signals outputted from the multiplier 1141(*n*). The band-pass filter 1144(*m*) of the uplink passes only the upstream signal with the frequency f0um for the base station among the signals outputted from the multiplier 1143(*m*) of the uplink.

The signal addition section 1145 adds together the plural intermediate signals with the frequencies fc+Δfcn+f0dn different from each other, and outputs the added downstream signals to be transmitted, to the E/O conversion section 123.

The branch section 1146 branches a reception signal including plural upstream signals corresponding to upstream electrical signals (RF signals) with plural upstream frequencies f0dm for the base station 30, which are outputted from the O/E conversion section 134.

The electro-optical signal conversion section of relay source has an E/O conversion section 124 as a downstream signal conversion section and an O/E conversion section 134 as an upstream signal conversion section. The E/O conversion section 124 converts the aforementioned downstream signal to be transmitted, which is outputted from the master radio section 114, to a downstream optical signal with the predetermined downstream wavelength λd. The O/E conversion section 134 converts the upstream optical signal with the upstream wavelength λu, which is transmitted from the slave repeater 20, to an intermediate signal with the frequency fc+Δfcm+f0um corresponding to the upstream electrical signal (RF signal) with the upstream frequency f0um for the base station 30, and outputs the converted intermediate signal to the master radio section 114.

The WDM 144 injects the downstream optical signal with the downstream wavelength λd, which is outputted from the E/O conversion section 124, into the transmission-path edge section of the optical fiber 71. The WDM 144 inputs the upstream optical signal with the upstream wavelength λu, which is emitted from the transmission-path edge section of the optical fiber 71, into the O/E conversion section 134.

The slave repeater 20 is provided with a slave radio section 214, electro-optical signal conversion sections (224, 234) of relay destinations, and a WDM 244 having a function as an optical directional coupler.

The slave radio section 214, which is connected to the antenna (antenna for mobile station) 202 with directivity toward the cell 200A, receives upstream signals with the plural (M) frequencies f0um (m=1 to M) for the base station of the uplink and transmits downstream signals with the plural (N) frequencies f0dn for the mobile stations of the downlink, via the antenna 202. The slave radio section 214 is configured by using, for example, a high-frequency amplifier (AMP), a signal processing section, and the like.

In the downlink, the signal processing section of the slave radio section 214 generates a downstream signal with the frequency f0dn for the mobile station, based on the intermediate signal with the frequency fc+Δfcn+f0dn after performing a conversion from the optical signal, and the signal with the carrier frequency fc+Δfcn. In the uplink, the signal processing section generates an intermediate signal with the frequency fc+Δfcm+f0um before performing a conversion to an optical signal, based on the upstream signal with the frequency f0m for the base station, and the signal with the carrier frequency fc+Δfcm.

The signal processing section of the slave radio section 214 is provided with, for example, a branch section 2141, a local oscillator, plural multipliers 2142(*n*) of the downlink, plural multipliers 2144(*m*) of the uplink, plural band-pass filters 2143(*n*) of the downlink, plural band-pass filters 2145(*m*) of the uplink, and a signal addition section 2146, as shown in FIG. 7.

The local oscillator can be configured with a signal generator (SG) for generating a plurality of signals with the carrier frequencies fc+Δfcn and signals with the carrier frequencies fc+Δfcm, in which the frequencies are different from each other, or the like.

The branch section 2141 branches a reception signal including plural downstream signals corresponding to the downstream electric signals (RF signals) with plural downlink frequencies f0dn for the mobile station 40 outputted from the O/E conversion section 224.

The multiplier 2142(*n*) of the downlink multiplies the intermediate signal with the frequency fc+Δfcn+f0dn by the signal with the carrier frequency fc+Δfcn. The multiplier 2144(*m*) of the uplink multiplies the upstream signal with the frequency f0um for the base station by the signal with the carrier frequency fc+Δfcm. The band-pass filter 2143(*n*) of the downlink passes only the downstream signal with the frequency f0dn for the mobile station among the signals outputted from the multiplier 2142(*n*). The band-pass filter 2145(*m*) of the uplink passes only the intermediate signal with the frequency fc+Δfcm+f0um among the signals outputted from the multiplier 2144(*m*) of the uplink.

The signal addition section 2146 adds together the plural intermediate signals with the frequencies fc+Δfcm+f0dm different from each other and outputs the added downstream signals to be transmitted, to the E/O conversion section 234.

The electro-optical signal conversion section of relay destination has an O/E conversion section 224 as a downstream signal conversion section and an E/O conversion section 234 as an upstream signal conversion section. The O/E conversion section 224 converts the downstream optical signal with the downstream wavelength λd, which is transmitted from the master repeater 10, to a reception signal including the plural downstream signals corresponding to the downstream electrical signals (RF signals) with downstream frequency f0dn for the mobile station 40, and outputs the converted reception signal to the slave radio section 214. The E/O conversion section 234 converts the upstream signal to be transmitted, which is outputted from the slave radio section 214, to an upstream optical signal with the predetermined upstream wavelength λu.

The WDM 244 injects the upstream optical signal with the upstream wavelength λu, which is outputted from the E/O conversion section 234, into the transmission-path edge section of the optical fiber 71. The WDM 244 inputs the downstream optical signal with the downstream wavelength λd, which is emitted from the transmission-path edge section of the optical fiber 71, into the O/E conversion section 224.

In the configuration example of the radio relay system in FIG. 7, the E/O conversion section 124, the O/E conversion section 134 and the WDM 144 of the master repeater 10, the O/E conversion section 224, the E/O conversion section 234 and the WDM 244 of the slave repeater 20, and the optical fiber 71 constitute the ROF system that is part of the radio relay system.

In the configuration example of FIG. 7, as for both the master repeater 10 and the slave repeater 20, the number of the E/O conversion section and the O/E conversion section with the optical wavelengths different from each other is one, respectively. Although the WDMs 144 and 244 are required, which respectively have a function as an optical directional coupler and bundles two waves of optical signals, a single optical fiber common to the downlink and the uplink lines is sufficient as an optical transmission medium.

As described above, according to the configuration example in FIG. 7, in the radio relay system in which the downlink is the MIMO transmission that uses the same frequency to transmit N signals (f0dn) simultaneously and the M signals (f0um) in the uplink are transmitted simultaneously using the same frequency, by adding together the N downlink signals with the frequencies (f0dn) and the M uplink signals with the frequencies (f0um) while differing by a predetermined frequency so as not to overlap each other, regarding the frequencies as one frequency-multiplexed downstream radio frequency and one frequency-multiplexed upstream radio frequency, and optically multiplexing one downlink signal and one uplink signal using optical elements (E/O conversion sections 124, 234 and O/E conversion sections 134, 224) with the wavelengths (λd, λu) different from each other, it is possible to relay the signals by the single optical fiber 71.

As described above, according to the present embodiments, since the communication between the master repeater 10 and the slave repeater 20 is performed by the ROF using the optical fiber 71, the radio frequencies fld and flu for relaying are unnecessary, and there is no interference due to the wraparound of radio waves of the same frequency.

According to the present embodiments, the slave repeater 20 is free from the interference due to the wraparound of radio waves of the same frequency, so that the slave repeater 20 can transmit at the maximum transmission power.

Further, according to the present embodiment, since the present system is a repeater-type radio relay system, and the slave repeater 20 does not need to perform a processing specific to the base station (eNodeB, gNodeB) such as baseband signal encoding and decoding into baseband signals, the apparatus configuration of the slave repeater 20 becomes simple and lightweight.

It is noted that, the process steps and configuration elements of the communication system including the radio relay system described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, Node B, terminal, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: master repeater
20: slave repeater
30: base station
31: antenna
40: mobile station
50: automobile
60: drone
70: cable
71, 71d, 71u: optical fiber
80: mobile communication network
81: remote control apparatus
101: antenna
110, 111, 112, 113, 114: master radio section
120, 121, 122, 123, 124: E/O conversion section
130, 131, 132, 133, 134: O/E conversion section
200A: cell
201: antenna
202: antenna
210, 211, 212, 213, 214: slave radio section
220, 221, 222, 223, 224: O/E conversion section
230, 231, 232, 233, 234: E/O conversion section
1131(1): first multiplier
1131(2): second multiplier
1132(1): first band-pass filter
1132(2): second band-pass filter
1133: multiplier
1134: band-pass filter
1135: signal addition section
1141(1) to 1141(N): multiplier
1142(1) to 1142(N): band-pass filter
1143(1) to 1143(M): multiplier
1144(1) to 1144(M): band-pass filter 1145: signal addition section
1146: branch section
2131: branch section
2132(1): first multiplier
2132(2): second multiplier
2133(1): first band-pass filter
2133(2): second band-pass filter
2134: multiplier
2135: band-pass filter
2141: branch section
2142(1) to 2142(N): multiplier
2143(1) to 2143(N): band-pass filter
2144(1) to 2144(M): multiplier
2145(1) to 2145(M): band-pass filter
2146: signal addition section

The invention claimed is:

1. A repeater type radio relay system, comprising:
a master repeater that is capable of performing a radio communication with a base station of a mobile-communication network side;
a slave repeater that is capable of performing a radio communication with a terminal apparatus and located in an upper airspace; and
one or plural optical fibers for relaying optical communication between the master repeater and the slave repeater;
a single optical fiber for propagating a downstream optical signal with a first wavelength, the downstream optical signal being directed from the master repeater to the slave repeater, and an upstream optical signal with a second wavelength different from the first wavelength, the upstream optical signal being directed from the slave repeater to the master repeater,
wherein the master repeater is mounted in a moving object capable of moving on a ground, sea or river,
wherein the master repeater includes:
a network-side communication section for performing a radio communication with the base station of the mobile-communication network side via an antenna; and
an electro-optical signal conversion section of the master repeater for performing a conversion between an electric signal of the radio communication with the base station of the mobile-communication network side received via the network-side communication section and an optical signal propagating through the optical fiber,
wherein the slave repeater is mounted in a floating object or a flying object moored to the moving object by a cable so as to stay or move in a predetermined airspace,
wherein the slave repeater includes:
a terminal-side communication section for wirelessly communicating with a terminal apparatus via an antenna; and
an electro-optical signal conversion section of the slave repeater for performing a conversion between an electric signal of the radio communication with the terminal apparatus via the terminal-side communication section and an optical signal propagating through the one or plural optical fibers,
wherein the electro-optical signal conversion section of the master repeater includes:
a downlink conversion section for converting a downstream electrical signal to the downstream optical signal with the first wavelength;
an uplink conversion section for converting the upstream optical signal with the second wavelength to an upstream electrical signal; and
a wavelength-division multiplex connection section that is connected to the downlink conversion section and the uplink conversion section and connected to the optical fiber,
wherein the electro-optical signal conversion section of the slave repeater includes:
a downstream-signal conversion section for converting the downstream optical signal with the first wavelength to a downstream electrical signal;
an upstream-signal conversion section for converting an upstream electrical signal to the upstream optical signal with the second wavelength; and
a wavelength-division multiplex connection section that is connected to the downlink conversion section and the uplink conversion section and connected to the optical fiber,
wherein the downlink transmission from the master repeater to the slave repeater is a MIMO transmission in which plural (N) signals are transmitted simultaneously using same frequencies,
wherein the master repeater includes plural downstream-signal conversion sections for converting plural (N) downstream electrical signals of the same frequencies received from the network-side communication section to plural (N) downstream optical signals with first wavelengths different from each other and inputting the converted signals into the optical fiber, and
wherein the slave repeater converts the plural (N) downstream optical signals with the first wavelengths outputted from the optical fiber to plural (N) electrical signals of the same frequencies and transfers the converted signals to the terminal-side communication section.

2. The repeater type radio relay system according to claim 1,
wherein the radio relay system performs the MIMO transmission in which two signals are transmitted simultaneously using a same frequency in a downlink from the master repeater to the slave repeater, and transmits one signal in an uplink from the slave repeater to the master repeater.

3. The repeater type radio relay system according to claim 1,
wherein the uplink transmission from the slave repeater to the master repeater is a MIMO transmission in which plural (N) signals are transmitted simultaneously using the same frequencies,
wherein the slave repeater comprises plural upstream-signal conversion sections for converting plural (M) upstream electrical signals received from the terminal-side communication section to plural (M) upstream optical signals with second wavelengths different from each other and inputting the converted signals into the optical fiber, and
wherein the master repeater converts the plural (M) upstream optical signals with the second wavelengths outputted from the optical fiber to plural (M) electrical signals and transfers the converted signals to the network-side communication section.

4. The repeater type radio relay system according to claim 1,
wherein an uplink transmission from the slave repeater to the master repeater is a MIMO transmission in which plural (M) signals are transmitted simultaneously using same first frequencies,
wherein the terminal-side communication section of the slave repeater generates plural intermediate signals obtained by changing the first frequencies of plural (M) upstream electrical signals to plural second frequencies different from each other, adds together the plural intermediate signals, and inputs the added plural intermediate signals into the upstream-signal conversion section, and
wherein the network-side communication section of the master repeater branches the plural intermediate signals with the plural second frequencies outputted from the upstream-signal conversion section, and outputs the plural intermediate signals by restoring the second frequencies of the plural intermediate signals to the first frequencies.

5. A repeater type radio relay system, comprising:
a master repeater that is capable of performing a radio communication with a base station of a mobile-communication network side;
a slave repeater that is capable of performing a radio communication with a terminal apparatus and located in an upper airspace; and
one or plural optical fibers for relaying optical communication between the master repeater and the slave repeater;
a single optical fiber for propagating a downstream optical signal with a first wavelength, the downstream optical signal being directed from the master repeater to the slave repeater, and an upstream optical signal with a second wavelength different from the first wavelength, the upstream optical signal being directed from the slave repeater to the master repeater,
wherein the master repeater is mounted in a moving object capable of moving on a ground, sea or river,
wherein the master repeater includes:
a network-side communication section for performing a radio communication with the base station of the mobile-communication network side via an antenna; and
an electro-optical signal conversion section of the master repeater for performing a conversion between an electric signal of the radio communication with the base station of the mobile-communication network side received via the network-side communication section and an optical signal propagating through the optical fiber,
wherein the slave repeater is mounted in a floating object or a flying object moored to the moving object by a cable so as to stay or move in a predetermined airspace,
wherein the slave repeater includes:
a terminal-side communication section for wirelessly communicating with a terminal apparatus via an antenna; and
an electro-optical signal conversion section of the slave repeater for performing a conversion between an electric signal of the radio communication with the terminal apparatus via the terminal-side communication section and an optical signal propagating through the one or plural optical fibers,
wherein the electro-optical signal conversion section of the master repeater includes:
a downlink conversion section for converting a downstream electrical signal to the downstream optical signal with the first wavelength;
an uplink conversion section for converting the upstream optical signal with the second wavelength to an upstream electrical signal; and
a wavelength-division multiplex connection section that is connected to the downlink conversion section and the uplink conversion section and connected to the optical fiber,
wherein the electro-optical signal conversion section of the slave repeater includes:
a downstream-signal conversion section for converting the downstream optical signal with the first wavelength to a downstream electrical signal;
an upstream-signal conversion section for converting an upstream electrical signal to the upstream optical signal with the second wavelength; and
a wavelength-division multiplex connection section for connecting that is connected to the downlink conversion section and the uplink conversion section and connected to the optical fiber,
wherein a downlink transmission from the slave repeater is a MIMO transmission in which plural (N) signals are transmitted simultaneously using same frequencies,
wherein the network-side communication section of the master repeater generates plural intermediate signals obtained by changing frequencies of plural (N) downstream electrical signals to plural frequencies different from each other, adds together the plural intermediate signals, and inputs the added plural intermediate signals into the downstream-signal conversion section, and
wherein the terminal-side communication section of the slave repeater branches the plural intermediate signals with the plural frequencies outputted from the downstream-signal conversion section, and outputs the plural intermediate signals by restoring the frequencies of the plural intermediate signals to the original frequencies.

6. The repeater type radio relay system according to claim 5,
wherein an uplink transmission from the slave repeater to the master repeater is a MIMO transmission in which plural (N) signals are transmitted simultaneously using the same frequencies,
wherein the slave repeater comprises plural upstream-signal conversion sections for converting plural (M) upstream electrical signals received from the terminal-side communication section to plural (M) upstream optical signals with second wavelengths different from each other and inputting the converted signals into the optical fiber, and
wherein the master repeater converts the plural (M) upstream optical signals with the second wavelengths outputted from the optical fiber to plural (M) electrical signals and transfers the converted signals to the network-side communication section.

7. The repeater type radio relay system according to claim 5,
wherein the uplink transmission from the slave repeater to the master repeater is a MIMO transmission in which plural (M) signals are transmitted simultaneously using same first frequencies,
wherein the terminal-side communication section of the slave repeater generates plural intermediate signals obtained by changing the first frequencies of plural (M) upstream electrical signals to plural second frequencies different from each other, adds together the plural intermediate signals, and inputs the added plural intermediate signals into the upstream-signal conversion section, and wherein the network-side communication section of the master repeater branches the plural intermediate signals with the plural second frequencies outputted from the upstream-signal conversion section, and outputs the plural intermediate signals by restoring the second frequencies of the plural intermediate signals to the first frequencies.

8. The repeater type radio relay system according to claim 5,
wherein the radio relay system performs the MIMO transmission in which two signals are transmitted simultaneously using the same frequencies in the downlink transmission from the master repeater to the slave repeater, and transmits one signal in an uplink transmission from the slave repeater to the master repeater.

9. A repeater type radio relay system, comprising:
a master repeater that is capable of performing a radio communication with a base station of a mobile-communication network side;
a slave repeater that is capable of performing a radio communication with a terminal apparatus and located in an upper airspace; and
one or plural optical fibers for relaying optical communication between the master repeater and the slave repeater;
a single optical fiber for propagating a downstream optical signal with a first wavelength, the downstream optical signal being directed from the master repeater to the slave repeater, and an upstream optical signal with a second wavelength different from the first wavelength, the upstream optical signal being directed from the slave repeater to the master repeater,
wherein the master repeater is mounted in a moving object capable of moving on a ground, sea or river,
wherein the master repeater includes:
a network-side communication section for performing a radio communication with the base station of the mobile-communication network side via an antenna; and
an electro-optical signal conversion section of the master repeater for performing a conversion between an electric signal of the radio communication with the base station of the mobile-communication network side received via the network-side communication section and an optical signal propagating through the optical fiber,
wherein the slave repeater is mounted in a floating object or a flying object moored to the moving object by a cable so as to stay or move in a predetermined airspace,
wherein the slave repeater includes:
a terminal-side communication section for wirelessly communicating with a terminal apparatus via an antenna; and
an electro-optical signal conversion section of the slave repeater for performing a conversion between an electric signal of the radio communication with the terminal apparatus via the terminal-side communication section and an optical signal propagating through the one or plural optical fibers,
wherein the electro-optical signal conversion section of the master repeater includes:

a downlink conversion section for converting a downstream electrical signal to the downstream optical signal with the first wavelength;
an uplink conversion section for converting the upstream optical signal with the second wavelength to an upstream electrical signal; and
a wavelength-division multiplex connection section that is connected to the downlink conversion section and the uplink conversion section and connected to the optical fiber,
wherein the electro-optical signal conversion section of the slave repeater includes:
a downstream-signal conversion section for converting the downstream optical signal with the first wavelength to a downstream electrical signal;
an upstream-signal conversion section for converting an upstream electrical signal to the upstream optical signal with the second wavelength; and
a wavelength-division multiplex connection section that is connected to the downlink conversion section and the uplink conversion section and connected to the optical fiber,
wherein an uplink transmission from the slave repeater to the master repeater is a MIMO transmission in which plural (N) signals are transmitted simultaneously using same frequencies,
wherein the slave repeater comprises plural upstream-signal conversion sections for converting plural (M) upstream electrical signals received from the terminal-side communication section to plural (M) upstream optical signals with second wavelengths different from each other and inputting the converted signals into the optical fiber, and
wherein the master repeater converts the plural (M) upstream optical signals with the second wavelengths outputted from the optical fiber to plural (M) electrical signals and transfers the converted signals to the network-side communication section.

10. The repeater type radio relay system according to claim 9,
wherein the radio relay system performs the MIMO transmission in which two signals are transmitted simultaneously using the same frequency in an uplink from the slave repeater to the master repeater.

11. A repeater type radio relay system, comprising:
a master repeater that is capable of performing a radio communication with a base station of a mobile-communication network side;
a slave repeater that is capable of performing a radio communication with a terminal apparatus and located in an upper airspace; and
one or plural optical fibers for relaying optical communication between the master repeater and the slave repeater;
a single optical fiber for propagating a downstream optical signal with a first wavelength, the downstream optical signal being directed from the master repeater to the slave repeater, and an upstream optical signal with a second wavelength different from the first wavelength, the upstream optical signal being directed from the slave repeater to the master repeater,
wherein the master repeater is mounted in a moving object capable of moving on a ground, sea or river, wherein the master repeater includes:
- a network-side communication section for performing a radio communication with the base station of the mobile-communication network side via an antenna; and
- an electro-optical signal conversion section of the master repeater for performing a conversion between an electric signal of the radio communication with the base station of the mobile-communication network side received via the network-side communication section and an optical signal propagating through the optical fiber, wherein the slave repeater is mounted in a floating object or a flying object moored to the moving object by a cable so as to stay or move in a predetermined airspace, wherein the slave repeater includes:
- a terminal-side communication section for wirelessly communicating with a terminal apparatus via an antenna; and
- an electro-optical signal conversion section of the slave repeater for performing a conversion between an electric signal of the radio communication with the terminal apparatus via the terminal-side communication section and an optical signal propagating through the one or plural optical fibers, wherein the electro-optical signal conversion section of the master repeater includes:
- a downlink conversion section for converting a downstream electrical signal to the downstream optical signal with the first wavelength;
- an uplink conversion section for converting the upstream optical signal with the second wavelength to an upstream electrical signal; and
- a wavelength-division multiplex connection section that is connected to the downlink conversion section and the uplink conversion section and connected to the optical fiber, wherein the electro-optical signal conversion section of the slave repeater includes:
- a downstream-signal conversion section for converting the downstream optical signal with the first wavelength to a downstream electrical signal;
- an upstream-signal conversion section for converting an upstream electrical signal to the upstream optical signal with the second wavelength; and
- a wavelength-division multiplex connection section that is connected to the downlink conversion section and the uplink conversion section and connected to the optical fiber, wherein an uplink transmission from the slave repeater to the master repeater is a MIMO transmission in which plural (M) signals are transmitted simultaneously using same first frequencies, wherein the terminal-side communication section of the slave repeater generates plural intermediate signals obtained by changing the first frequencies of plural (M) upstream electrical signals to plural second frequencies different from each other, adds together the plural intermediate signals, and inputs the added plural intermediate signals into the upstream-signal conversion section, and wherein the network-side communication section of the master repeater branches the plural intermediate signals with the plural second frequencies outputted from the upstream-signal conversion section, and outputs the plural intermediate signals by restoring the second frequencies of the plural intermediate signals to the first frequencies.

12. The repeater type radio relay system according to claim 11,
wherein the radio relay system performs the MIMO transmission in which two signals are transmitted simultaneously using the same frequency in the uplink transmission from the slave repeater to the master repeater.

* * * * *